United States Patent
Fliearman et al.

(10) Patent No.: US 10,138,729 B2
(45) Date of Patent: Nov. 27, 2018

(54) DRIVE ASSEMBLY WITH PRESSURE FORCE AGGREGATING PISTON ARRANGEMENT FOR HYDRAULIC MOTOR SPEED/TORQUE SELECTOR

(71) Applicant: Deere & Company, Moline, IL (US)

(72) Inventors: Steven R. Fliearman, Coffeyville, KS (US); Jeffrey S. Turner, Coffeyville, KS (US); Darren J. Ziskovsky, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 199 days.

(21) Appl. No.: 15/299,291

(22) Filed: Oct. 20, 2016

(65) Prior Publication Data

US 2018/0112530 A1  Apr. 26, 2018

(51) Int. Cl.
| | |
|---|---|
| *F01B 25/02* | (2006.01) |
| *B60K 17/08* | (2006.01) |
| *B60K 17/10* | (2006.01) |
| *B62D 55/125* | (2006.01) |
| *F01B 23/02* | (2006.01) |
| *F16D 55/24* | (2006.01) |

(52) U.S. Cl.
CPC .............. *F01B 25/02* (2013.01); *B60K 17/08* (2013.01); *B60K 17/10* (2013.01); *B62D 55/125* (2013.01); *F01B 23/02* (2013.01); *F16D 55/24* (2013.01)

(58) Field of Classification Search
CPC .......... F01B 25/02; F01B 23/02; F01B 3/105; F01B 3/106; F15B 11/032; F15B 11/0325
See application file for complete search history.

(56) References Cited

U.S. PATENT DOCUMENTS 2,484,603 A * 10/1949 Audemar ................ B64C 25/22
                                                                  416/156
3,673,926 A *  7/1972 Mohri .................... F15B 11/123
                                                                   91/170 R
(Continued)

FOREIGN PATENT DOCUMENTS

DE    198 42 029 A1   3/2000
DE    10128209 A1     1/2003

OTHER PUBLICATIONS

German Search Report for German Patent Application No. 102017216632.0 dated Jun. 15, 2018, 10 pages.
(Continued)

*Primary Examiner* — Thomas E Lazo
(74) *Attorney, Agent, or Firm* — Klintworth & Rozenblat IP LLP; Steven J. Wietrzny (57) ABSTRACT

A drive assembly includes a drive motor at least in part contained in a housing and having a rotor rotating an output shaft. A selector mechanism, at least in part contained in the housing, is movable into one of a plurality of orientations corresponding to one of a plurality of drive motor settings. An actuator, at least in part contained in the housing, is arranged to move the selector mechanism into one of the plurality of orientations. The actuator has first and second pistons each disposed in a piston chamber of the housing for movement by hydraulic pressure. The second piston is arranged in contact with the first piston and configured to aggregate and transfer forces from hydraulic movement of the first piston and the second piston to move the selector mechanism.

20 Claims, 4 Drawing Sheets

(56) References Cited

U.S. PATENT DOCUMENTS

| | | | | |
|---|---|---|---|---|
| 4,583,425 A * | 4/1986 | Mann | B60K 7/0015 | 180/308 |
| 4,896,585 A * | 1/1990 | Forster | F01B 3/02 | 74/60 |
| 6,283,721 B1 * | 9/2001 | Gollner | F03C 1/0694 | 417/222.1 |
| 6,425,313 B1 * | 7/2002 | Kleinedler | F01B 3/106 | 92/12.2 |
| 6,688,417 B2 * | 2/2004 | Hansell | B60K 7/0015 | 180/305 |
| 6,807,895 B2 * | 10/2004 | Hirano | F15B 11/024 | 92/13.6 |
| 6,840,879 B1 * | 1/2005 | Langenfeld | F16H 47/04 | 475/83 |
| 7,644,646 B1 * | 1/2010 | Peterson | F15B 11/12 | 91/422 |
| 7,698,893 B2 * | 4/2010 | Langeder | B21B 31/32 | 60/534 |
| 7,730,826 B2 * | 6/2010 | Becker | F04B 1/324 | 92/12.2 |
| 7,806,040 B2 * | 10/2010 | Peterson | F04B 1/324 | 92/12.2 |

OTHER PUBLICATIONS

Deere & Company, Drive Assembly With Multi-Function Actuator for Motor and Brake Control, pending U.S. Appl. No. 14/754,527, filed Jun. 29, 2015.

* cited by examiner

DRIVE ASSEMBLY WITH PRESSURE FORCE AGGREGATING PISTON ARRANGEMENT FOR HYDRAULIC MOTOR SPEED/TORQUE SELECTOR

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to drive assemblies, including drives having a multi-speed motor for transmitting rotational power to an output hub.

BACKGROUND OF THE DISCLOSURE

In various applications, a drive assembly may be utilized to provide rotational power to various components. In various wheeled or tracked vehicles, for example, a final drive assembly may be mounted to a frame of the vehicle to provide rotational power, at an output hub of the drive assembly, to drive the wheels or tracks of the vehicle, and thereby move the vehicle over terrain. Such a drive assembly (and others) may include hydraulic motors for providing rotational power, and various gears for adjusting the speed of the rotational power for output at the output hub. In some cases, the motors may be operated at one or more different speeds. Transitioning the drive motors into different speed and torque modes (e.g., by changing the degree of tilt of a swash plate impinged by one or more revolving pistons of the motor) may require significant force, and thereby robust actuating mechanisms. Arranging and packaging such actuating mechanisms in what oftentimes is a relatively tight space envelop may be a challenge.

SUMMARY OF THE DISCLOSURE

A drive assembly for the transmission of power is disclosed having a piston arrangement that aggregates the force of supplied hydraulic pressure for actuating a motor speed/torque selector mechanism.

According to one aspect of the disclosure, a drive assembly includes a housing and a drive motor at least in part contained in the housing and having a rotor rotating an output shaft. A selector mechanism, at least in part contained in the housing, is movable into one of a plurality of orientations corresponding to one of a plurality of drive motor settings. An actuator, at least in part contained in the housing, is arranged to move the selector mechanism into one of the plurality of orientations. The actuator has first and second pistons each disposed in the housing for movement by hydraulic pressure. The second piston is arranged in contact with the first piston and configured to aggregate and transfer forces from hydraulic movement of the first piston and the second piston to move the selector mechanism.

Another aspect of the disclosure provides a drive assembly for a final drive of a work vehicle. The drive assembly includes a mounting hub configured to secure to a frame of the work vehicle. A drive motor attached to the mounting hub has a rotor driving an output shaft. A swash plate is pivotally mounted with respect to the mounting hub about the output shaft and is movable into one of a plurality of tilt orientations corresponding to one of a plurality of motor speed settings. An actuator is arranged to pivot the swash plate into one of the plurality of tilt orientations. The actuator includes first and second pistons each disposed in a piston chamber of the housing for movement by hydraulic pressure along a stroke axis. The second piston is arranged in contact with the first piston and configured to aggregate and transfer forces from hydraulic movement of the first piston and the second piston to pivot the swash plate. A gear set is coupled to the output shaft, and an output hub receives rotational power from the motor via the output shaft and the gear set to provide motive power for the work vehicle. The output hub is driven at a first speed and torque when the swash plate is in a first tilt position, and the output hub is driven at a second speed and torque when the swash plate is in a second tilt position.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed drive assembly, as shown in the accompanying figures of the drawings described briefly above. Various modifications to the example embodiments may be contemplated by one of skill in the art.

As used herein, the "axial" direction may refer to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally parallel with the rotational axis of the shaft.

Also as used herein, "radially" aligned may refer to two components that are both disposed along a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned although one or both of the components may not be cylindrical (or otherwise radially symmetric). For example, a rotating shaft may be "radially" aligned with a rectangular housing containing the shaft over a length of the shaft that axially overlaps with the housing.

The disclosure may generally be thought of as providing an improved motor setting selection for fluid powered drives, such as hydraulic or pneumatic drives. Such drives may be used to deliver power in various applications, including, for example, to power various sub-components of work vehicles and implements. As one non-limiting example, the drive assembly may be a final drive arrangement for providing motive power to the wheels or track rollers for travel of various work vehicles, such as wheeled or tracked loaders, sprayers, graders and various other agricultural, construction and forestry machines.

The disclosure may also provide an arrangement for selecting the speed/torque of the motor of a drive assembly with more force acting on the selector without increasing the size of the drive assembly. As non-limiting examples, the motor may be a hydraulic motor, as is understood in the art, and the motor setting may be considered one or more of the output speed and torque of the motor, or as the physical displacement of the hydraulic fluid in the motor, which in turn affects the output speed and torque.

The actuating mechanism for motor speed/torque selection may be any suitable component that provides this function and fits into the space envelope of the drive assembly. This disclosure provides a hydraulic piston arrangement that increases (e.g., nearly doubles) the displaced volume of hydraulic fluid by an aggregation technique that does not require a corresponding (or in some cases any) increase in diameter of the piston bore, and thereby does not demand extra space within the drive housing or require the drive to be enlarged. By increasing the displaced volume of hydraulic fluid the piston arrangement is able to supply increased forces to the selector mechanism (e.g., a swashplate) and thereby better and more consistently overcome the internal forces of the motor tending to resist change in motor speed/torque selection.

In certain embodiments, the disclosed piston arrangement includes a plurality of pistons arranged to compound their output force with another. In some cases, there may be two "stacked" or axially aligned pistons generating two accumulated pressure forces, and in other cases, there may be three, four or more stacked pistons generating respective three, four or more accumulated pressure forces. In each case, the set of stacked pistons may be configured to reciprocate within a single, common bore. While at times the disclosure may describe a common-bore piston arrangement, it is also within the scope of this disclosure for the drive assembly to include multiple pistons in multiple bores, either one in each bore or multiple pistons in one or more bores. However configured, the disclosure provides a resultant pressure force that is consolidated from the pressure forces of two or more pistons and that is greater than that of a single piston, without simply increasing the displacement (i.e., piston head or bore diameters) of a single piston/bore arrangement.

It will be appreciated that not only may enhanced pressure forces may be achieved by aggregating force from multiple pistons in multiple bores and multiple pistons in a single bore, but there may also be variations in the configurations of the pistons and associated bore or bore section. For example, the piston heads may vary in diameter amongst each other, both when associated with different bores and when associated with different diameter sections of a common bore in which the different diameter sections are adjacent and axially aligned. Moreover, it will be appreciated that the stem of the one piston my transfer the pressure force by direct abutting contact with an adjacent piston head or by contacting an intermediate member disposed physically and functionally between the first piston stem and the second piston head.

In certain embodiments, the piston arrangement is a twin-piston arrangement in which two pistons are axially arranged in a common bore. Each piston has a predominately axially extending stem and an enlarged, predominately radially extending head. Pressure applied to one piston head generates a first force that is transferred by the corresponding piston stem to the head of the counterpart piston head to which pressure is also applied. The aggregated force realized by the stem of the second piston is thus greater than the pressure force arising from just one piston alone. The increase in pressure force follows a relationship defined by the amount of pressure applied to each head multiplied by the area of each head to which the pressure is applied. In certain configurations this stacked arrangement may achieve nearly a 2:1 increase in output force subject to the amount of area of the second piston taken up by the first piston stem. In various embodiments, the force multiplier ratio may be optimized by sizing (e.g., necking down) the first piston stem so as to reduce or minimize the area of the second piston head that is occupied.

In certain embodiments, each piston head may be arranged on opposite axial sides of an intermediate partition or "bulkhead," which separates the bore into two (or more) volumes or piston chambers, one for each piston head to reciprocate within when influenced by the presence (or absence) of hydraulic fluid pressure. The bulkhead may be formed integrally (as a unitary part of) the housing (or other component) defining the bore, or the bulkhead may be separate and distinct component that mounts within the bore in a generally sealed manner (e.g., via one or more O-rings or other seals). Either way, the bulkhead will have an opening that permits the first piston stem to contact the second piston head so as to transfer pressure forces.

In certain embodiments, the piston arrangement may have a single hydraulic pressure source or input to each piston-bore arrangement. Alternatively, the piston arrangement may have multiple pressure sources, such as one or more for each piston, either delivered to the drive assembly by a common line or separate lines, and then routed to each piston head through separate internal porting. In one example of a single pressure source twin-piston common-bore embodiment, a single line may deliver hydraulic fluid to the drive housing and to a common bore, via a fitting at an opening in one end of the bore. Hydraulic pressure is applied to the adjacent piston head through this opening. Hydraulic fluid is also passed through an axial channel or bore extending through the first piston head and stem to the volume of the bore adjacent the second piston head (e.g., on an opposite axial side of a bulkhead from the first piston head). The first stem/second head interface may be configured to ensure sufficient fluid flow to the second piston head.

Figure 1:
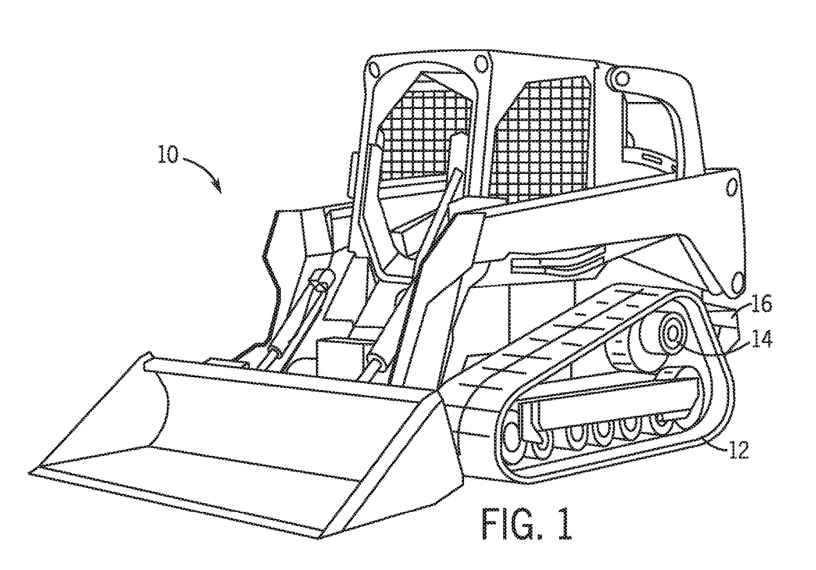
FIG. 1 is perspective view of an example work vehicle in the form of compact track loader with which a drive assembly according to the present disclosure may be implemented.

Referring now to the figures, the disclosed drive assembly may be utilized with an example work vehicle 10, as shown in FIG. 1. As depicted, the work vehicle 10 may be a compact track loader with ground-engaging tracks 12. An example drive assembly 14 is configured as a final drive assembly that is mounted to a frame 16 of the work vehicle 10 in order to provide motive power to the tracks 12. It will be understood that the depicted work vehicle 10 is presented as an example only, and that the disclosed drive assembly (e.g., the drive assembly 14) may be utilized with other vehicles (or other machines), for example, including any vehicle where the motive power is provided by one or more hydraulic final drives. Further, it will be understood that the disclosed drive assembly may be utilized as a final drive assembly (e.g., as depicted for the drive assembly 14) for providing motive power to a ground-engaging element (e.g., wheels, etc.) of a vehicle, or may be utilized to provide rotational power to other types of devices.

Figure 2:
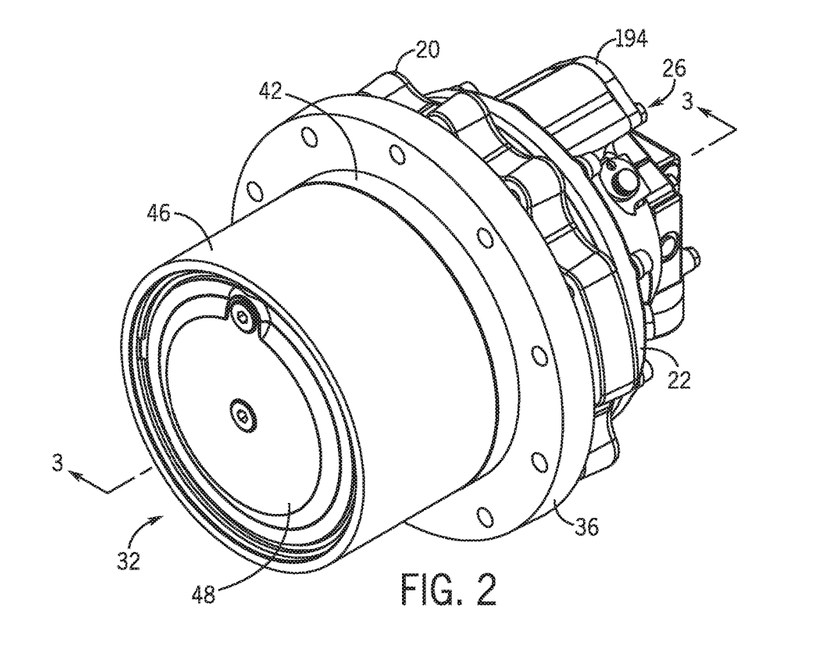
FIG. 2 is a perspective view of an example drive assembly according to the present disclosure for use with the example work vehicle of FIG. 1.
Figure 3:
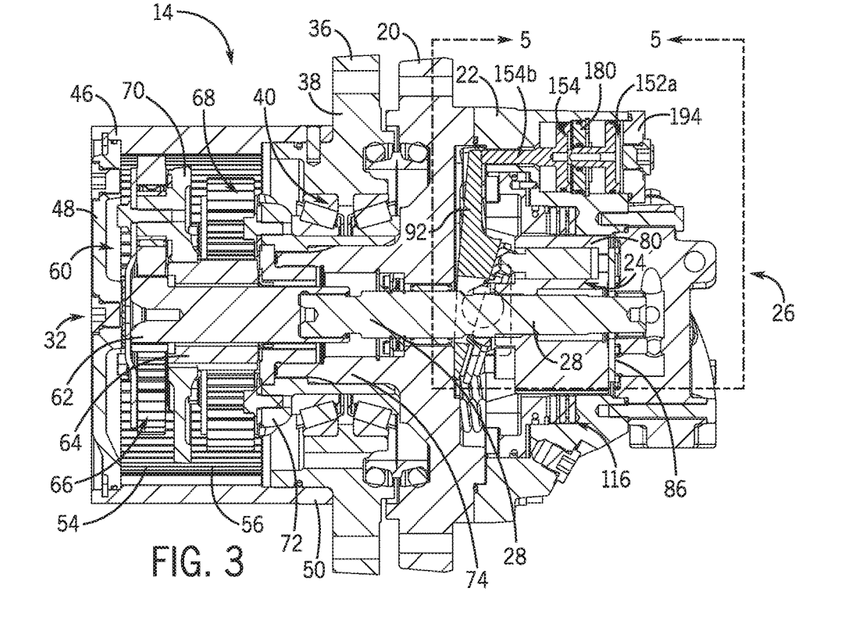
FIG. 3 is a side sectional view of the drive assembly of FIG. 2 having a motor speed/torque selector actuator configured as an example pressure force aggregating piston arrangement according to this disclose.

Referring also to FIGS. 2 and 3, an example configuration of the drive assembly 14 is presented. Various components (or assemblies) of the drive assembly 14 may generally exhibit radial symmetry, such that for these components the sectional view depicted in FIG. 3 may represent a view of any number of diametric planes through the drive assembly 14. In certain embodiments, the disclosed drive assembly may exhibit various radial asymmetries. As depicted, the example drive assembly 14 may include a mounting hub 20 configured for attachment to the frame 16 of the work vehicle 10, and thus may be utilized as a final drive assembly for driving the tracks 12 of the work vehicle 10. The mounting hub 20 is included as part of a larger housing or mounting structure 22 for the drive assembly 14, which may be generally configured to remain relatively stationary during operation of the drive assembly 14.

The drive assembly 14 may also include an output interface. As depicted, the output interface is configured as an output hub 36, although other configurations may be possible. Generally, the output hub 36 includes a hub body 38, which may extend within the drive assembly 14 to rest on various bearings 40 (e.g., roller or ball bearings). The output hub 36 may also include an attachment lip 42, which extends from the hub body 38, towards an axial end 32 of the drive assembly 14, to an axial end of the attachment lip 42. As depicted, the output hub 36 is configured to engage (directly or indirectly) the tracks 12 of the work vehicle 10, such that rotation of the output hub 36 may drive movement of the tracks 12 and, thereby, movement of the work vehicle 10. In other embodiments, other output interfaces may be utilized to engage with the tracks 12 or other external devices.

The drive assembly 14 may further include a housing configured to engage with the attachment lip of the relevant output interface, such that rotational power may be transmitted from the housing to the output interface via co-rotation (i.e., rotation in unison) of the housing and the output interface. As depicted, for example, a housing cylinder 46 may include and end cap 48 and a hub end 50, which is configured to attach to the output hub 36 via the attachment lip 42. The housing cylinder 46 may be coupled to the mounting hub 20 by mounting the hub end 50 of the housing cylinder 46 onto the output hub 36.

A motor 24 may be mounted to the mounting structure 22, or motor housing, (and, thereby, to the mounting hub 20) at one axial end 26 of the drive assembly 14, such that the motor 24 may be held in an appropriately stationary orientation for delivery of rotational power to various external devices (e.g., the tracks 12 of FIG. 1). As shown, the motor 24 is configured as a hydraulic motor with a brake assembly 30, and an output shaft 28 extending towards the axial end 32 of the drive assembly 14. Rotational power may be transmitted in various ways from the motor 24 to the housing cylinder 46 and thereby, via the attachment between the attachment lip 42 and the hub end 50 of the housing cylinder 46, to the output hub 36. As depicted, for example, one or more sets of teeth may be integrally (or otherwise) formed on an interior circumference of the housing cylinder 46, such that the housing cylinder 46 includes one or more interior ring gear interfaces, such as ring gear interfaces 54, 56. A gear set (e.g., a double planetary gear set) utilizing the ring gear interfaces 54, 56 may be disposed within the housing cylinder 46 in order to provide an appropriate speed reduction between the rotation of the output shaft 28 (e.g., as powered by the motor 24) and the rotation of the housing cylinder 46 (e.g., as it powers rotation of the output hub 36 and, thereby, the relevant external device).

As in the illustrated example, the drive assembly 14 may include an example double planetary gear set 60, with sun gears 62 and 64, sets of planet gears 66 and 68, and planet gear carriers 70 and 72. The planet gears 66 are meshed with the sun gear 62 and with the ring gear interface 54. The planet gears 68 are meshed with the sun gear 64 and with the ring gear interface 56. The planet gear carrier 70 is fixed to (e.g., secured to or integrally formed with) the sun gear 64, and the planet gear carrier 72 is fixed to (e.g., secured to or integrally formed with) an extended neck 74 of the mounting hub 20. With such a configuration, the sun gear 64 may be rotated by the planet gear carrier 70, via movement of the planet gears 66 around the sun gear 62, while the axes of rotation of the various planet gears 68 may be fixed in place via the connection between the planet gear carrier 72 and the neck 74. It will be understood, however, that other configurations may be possible.

With the depicted planetary gear set 60, rotational power is routed from the motor 24 to the housing cylinder 46. For example, when the sun gear 62 is rotated by the motor 24 (i.e., via the output shaft 28) rotational power is transmitted by the sun gear 62, through the planet gears 66, both to the sun gear 64 (via the planet gear carrier 70) and to the housing cylinder 46 (via the ring gear interface 54). Rotational power received at the sun gear 64 is further transmitted to the housing cylinder 46 via the planet gears 68, being facilitated by the fixed connection between the planet gear carrier 72 and the neck 74, and the ring gear interface 56. Due to the attachment between the housing cylinder 46 and the output hub 36, rotational power from the housing cylinder 46 may then be transmitted to the output hub 36, and thereby, to the relevant external device. In various embodiments, the ring gear interfaces 54, 56 may be disposed on the housing cylinder 46 such that, when the hub end 50 of the housing cylinder 46 is attached to the output hub 36 via the attachment lip 42, the ring gear interfaces 54, 56 are either radially aligned or not radially aligned (i.e., do not axially overlap) with the attachment lip 42. Further, the planetary gear set 60 may be configured such that the various sun and planet gears are also not radially aligned with the attachment lip 42 when the housing cylinder 46 is attached to the output hub 36. In other embodiments, other configurations may be possible.

Referring still to FIG. 3, the motor and brake arrangement and operation will now be described. As mentioned, the motor 24 may be mounted within the mounting structure 22 at the axial end 26 of the drive assembly 14. The motor 24 may be a hydraulic motor with its output shaft 28 extending towards axial end 32 of the drive assembly 14. The motor 24 may have an annular cylinder block or rotor 80, which is mounted for co-rotation with an integral rod end of the output shaft 28. Cylinder chambers 82 may be spaced about the rotor 80 generally parallel to the output shaft 28. The cylinder chambers 82 hold pistons 84 that each have end that reciprocates in the cylinder chambers 82. Hydraulic oil or other working fluid under pressure enters the cylinder chambers 82 through one or more ports (not shown) in a valve plate 86 at one end of the rotor 80. Filling the open volume in the cylinder chambers 82 with hydraulic fluid drives the pistons 84 to extend out from the rotor 80, while withdrawing the hydraulic fluid allows the pistons 84 to retract, as is understood in the art. The pistons 84 may have free ends, which may be fixed with rollers or other friction-reducing members, that engage a shoe 90 of a swash plate 92 that is adjustably mounted (e.g., by ball connections 94 of the mounting hub 20) to pivot about a tilt axis, which is at an angle (e.g., orthogonal) to the rotational axis of the motor 24. The pistons 84, in effect, push the swash plate 92, by engagement of the free ends of the pistons 84 with the shoe 90, to rotate the rotor 80.

The brake assembly 30, which may be in the form of a spring-applied, hydraulically-released park brake assembly, is coupled to the rotor 80. For example, as in the illustrated example, the brake assembly 30 may include three annular brake disks 100 that rotate with the rotor 80 and two annular friction disks 102 that are attached to the mounting structure 22. The attachment of the brake disks 100 to the rotor 80 and the friction disks 102 to the mounting structure 22 may be made in any suitable manner. For example, the brake disks 100 may have teeth (not shown) spaced along its inner periphery that engage axially-running splines on the outer periphery of the rotor 80. Engagement of the teeth of the brake disks 100 with the splines of the rotor 80 cause the brake disks 100 to rotate with the rotor 80 as it turns. The mounting structure 22 has an annular brake flange 106 against which abuts an outer one of the brake disks 100 when the brake assembly 30 is braked. This arrests the gross axial movement of the brake disks 100, such that facial surfaces of the brake disks 100 move into abutting relation with the interleaved friction disks 102, which, with the application of sufficient axial force, use frictional force to slow and stop rotation of the brake disks 100, and thereby the rotor 80.

Actuation and release of the brake assembly may be accomplished, at least in part, by a brake actuator mechanism, including a brake piston 110 and a spring plate 112. As illustrated, for example, the brake piston 110 may be a relative large annular component disposed about the rotor 80 and having an annular brake flange 114, which is oriented to engage an inner one of the brake disks 100 when the brake assembly 30 is braked. A spring, or more aptly, a spring arrangement 116 engaging the spring plate 112 is configured, in the absence of countering hydraulic pressure, to engage and apply an axial force to the brake piston 110, which, when the brake flange 114 engages the brake assembly 30, moves the brake disks 100 axially into frictional engagement with the friction disks 102, to slow and stop the rotor 80. The spring arrangement 116 may include an array of springs (e.g., 6-12 springs) arranged about the output shaft 28 and held in recessed pockets (not shown) in the mounting hub 20 and oriented to engage the spring plate 112. The count and type of springs in the spring arrangement 116 may vary to provide the desired spring length and rate, including various single and dual rate helical coil springs, Belleville springs or other compression springs. The swash plate 92 may have one or more openings to accommodate one or more of the springs in the spring arrangement 116, as needed.

Pressurizing via hydraulic fluid a pressure surface of the brake piston 110 causes axial movement of the brake piston 110 toward the axial end 32 of the drive assembly 14 that counters the spring force of the spring arrangement 116 and releases the brake assembly 30 to permit the rotor 80 of the motor 24 to rotate. The configuration of the pressure surface may take various forms, including a single pressure surface or multiple pressure surfaces that may be acted upon individually or in the aggregate to provide varying forces for different axial movement of the brake piston 110 under constant system pressure operating conditions. As illustrated, the pressure surface may be in the form a stepped outer face 118 of the brake piston 110 that, along with the mounting structure 22, defines a corresponding pressure cavity 120, which is sealed by two O-rings 122 disposed in annular grooves in the peripheral edges of the stepped brake piston 110 or in the mounting structure 22. The brake assembly 30, such as configured in the illustrated embodiment, may serve as a park brake or to provide a "park" mode for the drive assembly 14. As noted, however, hydraulic pressure may be applied to the brake assembly 30 is various other ways, and the brake assembly 30 may serve other non-park braking operations.

Figure 5A:
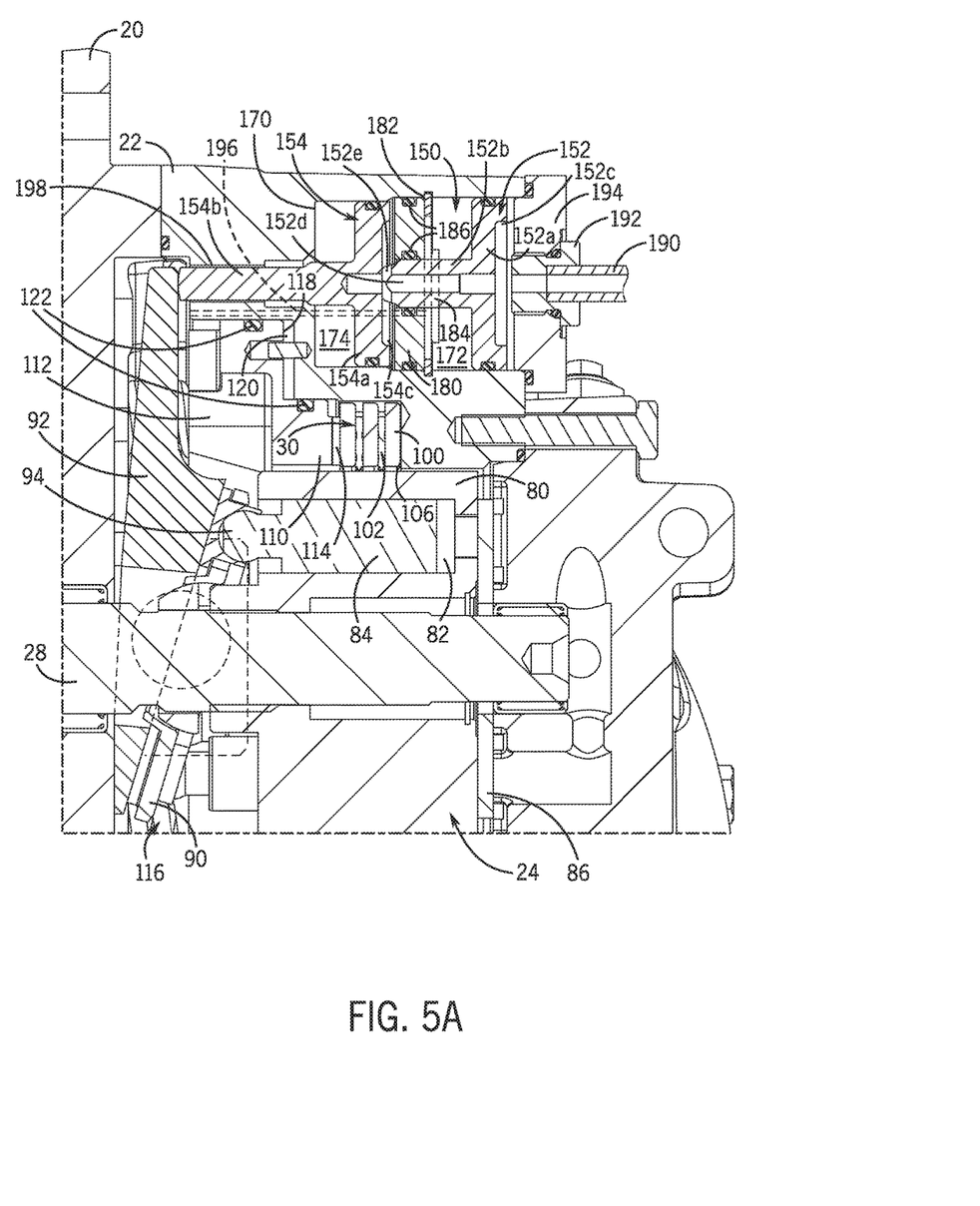
FIGS. 5A and 5B are partial side sectional views of the area 5-5 in FIG. 3 showing the example the motor speed/torque selector in two different orientations corresponding to two distinct speed/torque conditions of the motor of the drive assembly of FIG. 2.
Figure 5B:
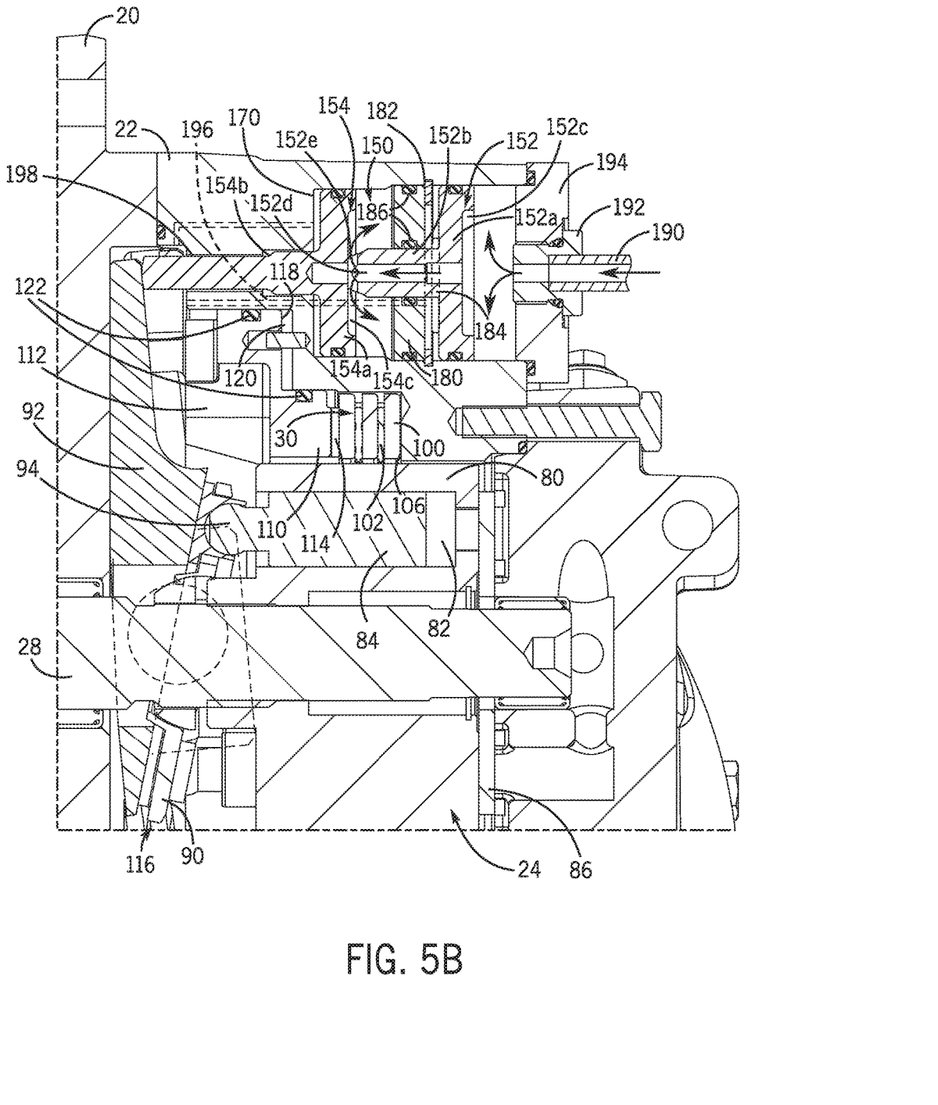

The speed and torque of the motor 24, and thus of the drive assembly 14, is set by the tilt orientation of the swash plate 92. Although various motor configurations may be utilized, in the illustrated embodiment, when the swash plate 92 is at an increased tilt angle with respect to the tilt axis (e.g., normal or oblique to the rotation axis of the motor 24), such as shown in FIG. 5B, the stroke of the pistons 84 increases, which raises the displacement, or volume of pressurized fluid in the cylinder chambers 82, and causes the rotor 80, and thereby the output shaft 28, to rotate a relatively low speed with a relatively high torque. Conversely, when the swash plate 92 is a decreased tilt angle with respect to the rotation axis of the motor 24, such as shown in FIG. 5A, the piston stroke decreases, which lowers the displacement, or volume of pressurized fluid in the cylinder chambers 82, and causes the rotor 80, and thereby the output shaft 28, to rotate a relatively high speed with a relatively low torque. In this way, the speed/torque setting of the motor 24 may be selected by changing the position of the swash plate 92, which may thus be considered a "selector" or be part of a "selector mechanism."

The motor speed and torque setting may be discrete (e.g., binary), which is achieved by moving the swash plate 92 into one of two or more distinct swash plate tilt orientations in step-wise or on-off fashion, or it may be continuously variable by a generally continuous or infinite tilt angle adjustment. In the illustrated embodiment, the drive assembly 14 is a two-speed drive, with the swash plate 92 being pivoted into one of the two tilt orientations shown in FIGS. 5A and 5B. In this configuration, the quantity and/or rates of the springs in the spring arrangement 116 are selected to provide the appropriate closing force on the brake assembly 30 and to open with the desired hydraulic pressure on the pressure surface 118 of the brake piston 110. Alternatively, variable motor speed selection may be achieved by changing system pressure or using of one or more variable-flow electrohydraulic control valves as well as by configuring the spring arrangement 116 and the pressure surface 118 appropriately (e.g., including multi-rate springs and/or additional pressure cavities in order to provide additional motor speed to approximate continuous variability).

Figure 4:
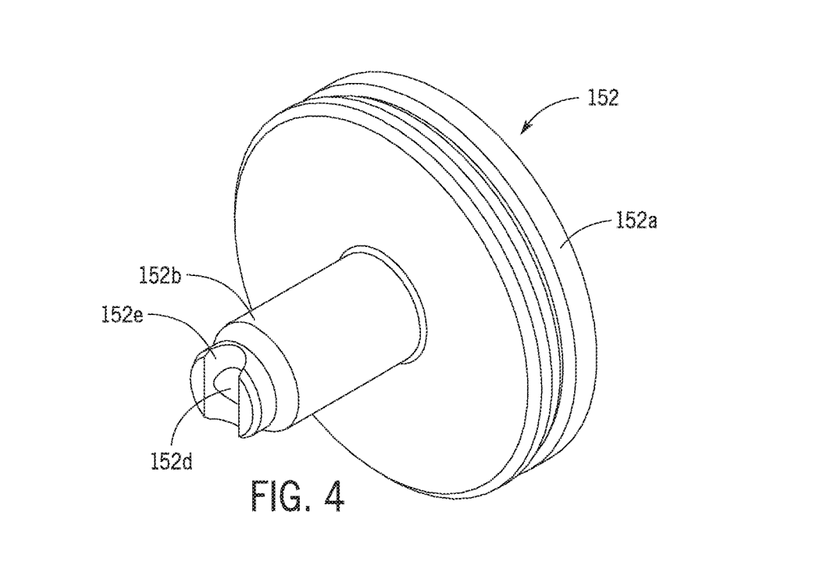
FIG. 4 is an enlarged perspective view an example piston of the selector actuator piston arrangement shown in FIG. 3.

Referring now also to FIGS. 4 and 5A-5B, the motor speed/torque selector mechanism, which in the illustrated example is, or at least includes, the swash plate 92, is actuated by a selector actuation mechanism. In the example, the selector actuator is a hydraulic piston arrangement which provides a force for change the tilt orientation of the swash plate 92. The selector actuator may impart a bi-directional push-pull force to the swash plate 92, or, as in the illustrated example, it may provide a unidirectional force (e.g., a pushing force) that acts on the swash plate 92 to move it into only one of its end-of-travel tilt orientations, specifically, the orientation shown in FIG. 5B. The motor pistons 84 acting on the shoe 90 drives the swash plate 92 to the orientation shown in FIG. 5A in the absence of the force form the selector actuator.

The force acting on the swash plate 92 by the motor 24 may be significant, particularly as the capacity of the drives is increased and larger motors are used. The selector actuator must provide sufficient force to overcome the counteracting force from the motor 24. As such, in order to provide sufficient force for reliable, consistent motor speed/torque selection, and thus operation of the drive assembly 14, the selector actuator in pre-existing drives may need to either occupy more internal volume within the drive assembly or project outward of the drive assembly. The latter may not be possible for certain applications (e.g., final drives), which may have a predefined space envelope.

The disclosed selector actuator is a piston arrangement having at least two hydraulically actuated pistons the individual axial forces of which are combined or aggregated to provide an enhanced resulting force in the axial direction that is greater than the force generated by a single piston alone. In various embodiments, such piston arrangements may include multiple pistons (e.g., 2, 3, etc.) within a single piston chamber or bore (of either a uniform or varied (e.g., stepped) diameter), or multiple piston chambers or bores, each with one or more pistons, provided the axial forces generated by the piston movement are aggregated to effect an enhanced force on the selector mechanism (e.g., the swash plate 92). Moreover, in various embodiments, the selector actuator may be configured to transfer the actuating force by direct contact of one or more pistons with the selector mechanism, or via contact with one or more intermediate components.

In the illustrated example, the selector actuator 150 is a single pressure source, single uniform bore, double piston arrangement in which two pistons 152, 154 are axially aligned or "stacked" within a common bore 170 in which the pistons 152, 154 reciprocate. Although oblique or other axial orientations are possible, in the example embodiment the pistons 152, 154 align along, a piston axis that is in parallel with the motor axis. The piston bore 170 may be formed in various locations, such as in the mounting structure 22, and is generally concentric with the piston axis. The piston bore 170 is functionally divided to form one sub-chamber for each piston, or in this example, two sub-chambers 172, 174. Any suitable partition feature may be used to divide the piston bore 170, including an integrally-formed or monolithic wall of the mounting structure 22 or a separate component, such as a bulkhead 180. The bulkhead 180 may be secured in place in any suitable mechanical means, including welding, soldering, brazing, adhesion and the like as well as by mechanical fasteners, such as a snap-ring 182 that captures and holds the bulkhead 180 against a shoulder at the inner diameter of the piston bore 170. The bulkhead 180 has an opening, which allows the pistons 152, 154 to interface with one another, such as via a central through-hole 184. The inner and outer peripheral edges (or diameters) are sealed with O-rings 186 disposed in associated grooves in the bulkhead 180 or mating parts.

The pistons 152, 154 themselves each include piston heads 152a, 154a and piston stems 152b, 154b. In the example embodiment, the piston heads 152a, 154a have the same configuration of an annular body with a recessed face and a piston seal at its outer diameter. The piston seals create dynamic seals to maintain upstream pressure during reciprocation, and the recesses 152c, 154c in the upstream faces ensure there are pressure surfaces of sufficient areas to move the pistons 152, 154 when situated closely to the fluid entry location (e.g., when each piston is at its rightmost position in FIG. 5A). The piston stems 152b, 154b, which may be separate and connected to the piston heads 152a, 154a or integrally formed as a unitary part therewith, are of a lesser radial dimension, extending predominately in the axial direction, with the piston stem 154b being longer than the piston stem 152b in the illustrated example so as to extend into contact with an extension of the swash plate 92. As shown, these components may be in direct, physically abutting contact, but are not otherwise mechanically connected, such that the piston arrangement imparts a one-way, pushing force to the swash plate 92. The piston stem 152b extends through the through-hole 184 in the bulkhead 180 to be in direct, physically abutting contact with the piston head 154a. By pressurizing each of the sub-chambers 172, 174, the pressure force imparted to the piston 152 is transferred directly to the piston 154, which has its own pressure force that is combined or aggregated with that transferred from the piston 152. The enhanced, aggregated force is transferred to the swash plate 92 to move change its tilt orientation from the FIG. 5A orientation to the FIG. 5B orientation, and thus change the motor speed and torque. Venting the piston bore 170, and specifically the sub-chambers 172, 174 allows the motor 24 to return the swash plate 92 to the FIG. 5A orientation.

The amount of axial force derived from the hydraulic pressure acting on the piston 152 is a ratio of the applied pressure within the sub-chamber 172 to the pressure surface area of the piston head 152a. This force is transferred to the piston 154 as described above. The amount of axial force derived from the hydraulic pressure acting on the piston 154 is a ratio of the applied pressure within the sub-chamber 174 to the pressure surface area of the piston head 154a minus the contact area with the piston stem 152b. The resultant net force applied to the swash plate 92 is the sum of these two forces. Thus, in the illustrated example in which the common bore 170 has a uniform diameter (and thus the piston heads 152a, 154a are the same diameter) the aggregated force will be some value near, but less than double the force generated by an individual piston alone. Force multipliers of more or less than two may be achieved, however, by the use of more than two pistons or by utilizing piston bores or sub-chambers (and thus piston heads) of different diameters (and thus of different pressure surface areas).

Hydraulic fluid delivery to the piston bore 170 may be by two separate lines running to the drive assembly 14 and connecting to two fittings which lead to separate internal porting passages, which each open to one of the sub-chambers 172, 174 of the piston bore 170. Alternatively, the separate internal porting may lead from a single plumbing line and fitting. In the illustrated example, a single plumbing line 190 and a single fitting 192 mount to an end plate 194 and open directly to the sub-chamber 172. Hydraulic fluid is routed to the sub-chamber 174 by a central axial channel 152d in the piston stem 152b that opens to the recess 152c and an outlet port 152e. As shown in FIG. 4, in the example embodiment the piston stem 152b necks down at the end has an open-sided cross-drilled passage defining the outlet port 152e. The latter ensures that sufficient hydraulic fluid can flow into the sub-chamber 174 despite the abutting contact at the interface between the piston stem 152b and the piston head 154a. While still being robust, the narrowed end of the piston stem 152b reduces the contact area with the piston head 154a, which increases its effective pressure surface area and pressure force, and thereby increases the resultant force acting on the swash plate 92. In addition, this arrangement requires minimal, and relatively uncomplicated, hydraulic lines, porting and routing through the drive assembly 14 for controlling the motor selection. A small vent passage 196 may be formed in the mounting structure 22 to vent the sub-chamber 172, and sub-chamber 174 may be vented by the narrow annular gap 198 between the piston stem 154b and the mounting structure 22.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A drive assembly, comprising:
    a housing;
    a drive motor at least in part contained in the housing and having a rotor rotating an output shaft;
    a selector mechanism at least in part contained in the housing and movable into one of a plurality of orientations corresponding to one of a plurality of drive motor settings; and
    an actuator at least in part contained in the housing and arranged to move the selector mechanism into one of the plurality of orientations, the actuator including:
        a first piston disposed in the housing for movement by hydraulic pressure; and
        a second piston disposed in the housing for movement by hydraulic pressure, the second piston being arranged in contact with the first piston and configured to aggregate and transfer forces from hydraulic movement of the first piston and the second piston to move the selector mechanism.

2. The drive assembly of claim 1, wherein the housing includes a piston chamber within which the first and second pistons move along a stroke axis.

3. The drive assembly of claim 2, wherein the first and second pistons each have an enlarged head a narrow stem; wherein the stem of the first piston contacts the head of the second piston; and
    wherein the stem of the second piston contacts the selector mechanism.

4. The drive assembly of claim 3, wherein the housing defines multiple fluid passages for hydraulic fluid to enter the piston chamber in a volume upstream of the head of the first piston and in a volume axially between the heads of the first and second pistons.

5. The drive assembly of claim 3, wherein the housing defines a single fluid passage for hydraulic fluid to enter the piston chamber in a volume upstream of the head of the first piston.

6. The drive assembly of claim 5, wherein the housing defines vent passages opening from the piston chamber in volumes downstream of the head of each of the first and second pistons.

7. The drive assembly of claim 3, wherein the actuator further includes a bulkhead within the piston chamber axially between the heads of the first and second pistons; and
    wherein hydraulic pressure is applied to the head of the first piston at a first axial side of the bulkhead and hydraulic pressure is applied to the head of the second piston at a second axial side of the bulkhead.

8. The drive assembly of claim 7, wherein the stem of the first piston contacts the head of the second piston at the second axial side of the bulkhead.

9. The drive assembly of claim 8, wherein the housing defines a single fluid passage for hydraulic fluid to enter the piston chamber in a volume upstream of the head of the first piston; and
    wherein the stem of the first piston has an axial bore through hydraulic fluid is communicated to the second side of the bulkhead to apply hydraulic pressure to the head of the second piston.

10. The drive assembly of claim 7, wherein the piston chamber defines an inner shoulder against which the bulkhead is mounted by a fastener to the housing.

11. The drive assembly of claim 10, wherein an outer seal is disposed between the bulkhead and the housing and an inner seal is disposed between the stem of the first piston and an opening in the bulkhead which receives the stem of the first piston; and
    wherein the inner and outer seals partition the piston chamber into two distinct pressure chambers.

12. The drive assembly of claim 3, wherein the heads of the first and second pistons each have a recessed upstream-side face.

13. The drive assembly of claim 1, wherein the drive motor is a hydraulic motor and the selector mechanism is a swash plate pivotally coupled with respect to the housing to be moved by the actuator into one of a plurality of tilt orientations with respect to a rotation axis of the motor; and
    wherein the swash plate has a work surface at an oblique angle with respect to the rotation axis, the work surface impinged by one or more pistons of the drive motor such that a stroke of each of the pistons is different for each of the plurality of tilt orientations of the swash plate.

14. The drive assembly of claim 13, further including a brake assembly at least in part contained in the housing and configured to couple to the rotor of the drive motor, the brake assembly moveable between a braked position in which the brake assembly impedes rotation of the rotor and a released position in which the brake assembly allows rotation of the rotor; and an actuator at least in part contained in the housing and arranged to engage the brake assembly at least when the brake assembly is in the braked position and to engage the selector mechanism at least when the brake assembly is in the released position.

15. The drive assembly of claim 14, wherein the brake assembly includes a plurality of interleaved brake disks and friction plates arranged about the rotor of the drive motor, the brake disks being coupled for rotation with the rotor of the drive motor and the friction plates being mounted in fixed relation to the housing; and wherein, at least in the braked position of the brake assembly, the piston engages at least one of the brake disks and the friction plates so that the friction plates frictionally engage the brake disks to impede rotation of the brake disks and the rotor of the drive motor.

16. A drive assembly for a final drive of a work vehicle, the drive assembly comprising:

a mounting hub configured to secure to a frame of the work vehicle;

a drive motor attached to the mounting hub, the drive motor having a rotor driving an output shaft;

a swash plate pivotally mounted with respect to the mounting hub about the output shaft and movable into one of a plurality of tilt orientations corresponding to one of a plurality of motor speed settings;

an actuator arranged to pivot the swash plate into one of the plurality of tilt orientations, the actuator including:

a first piston disposed in a piston chamber of the housing for movement by hydraulic pressure along a stroke axis; and a second piston disposed in the piston chamber of the housing for movement by hydraulic pressure along the stroke axis, the second piston being arranged in contact with the first piston and configured to aggregate and transfer forces from hydraulic movement of the first piston and the second piston to pivot the swash plate;

a gear set coupled to the output shaft; and an output hub receiving rotational power from the motor via the output shaft and the gear set to provide motive power for the work vehicle;

wherein the output hub is driven at a first speed and torque when the swash plate is in a first tilt position and the output hub is driven at a second speed and torque when the swash plate is in a second tilt position.

17. The drive assembly of claim 16, wherein the swash plate has a work surface at an oblique angle with respect to the rotation axis of the motor, the work surface impinged by one or more pistons of the drive motor such that a stroke of each of the pistons is different for each of the plurality of tilt orientations of the swash plate.

18. The drive assembly of claim 16, wherein the first and second pistons each have an enlarged head a narrow stem;

wherein the stem of the first piston contacts the head of the second piston; and wherein the stem of the second piston contacts the swash plate.

19. The drive assembly of claim 18, wherein the actuator further includes a bulkhead within the piston chamber axially between the heads of the first and second pistons;

wherein hydraulic pressure is applied to the head of the first piston at a first axial side of the bulkhead and hydraulic pressure is applied to the head of the second piston at a second axial side of the bulkhead; and wherein the stem of the first piston contacts the head of the second piston at the second axial side of the bulkhead.

20. The drive assembly of claim 19, wherein the piston chamber has a single fluid passage for hydraulic fluid to enter the piston chamber in a volume upstream of the head of the first piston; and wherein the stem of the first piston has an axial bore through hydraulic fluid is communicated to the second side of the bulkhead to apply hydraulic pressure to the head of the second piston.

* * * * *